United States Patent
Harzschel et al.

(10) Patent No.: US 7,250,468 B2
(45) Date of Patent: Jul. 31, 2007

(54) POLYVINYL-ALCOHOL-STABILIZED REDISPERSIBLE POWDERS WITH PLASTICIZING PROPERTIES

(75) Inventors: Reinhard Harzschel, Burghausen (DE); Thomas Bastelberger, Emmerting (DE); Ulf Dietrich, Ludwigshafen (DE); Armin Hoffmann, Neuoetting (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 287 days.

(21) Appl. No.: 10/819,444

(22) Filed: Apr. 7, 2004

(65) Prior Publication Data

US 2004/0204518 A1 Oct. 14, 2004

(30) Foreign Application Priority Data

Apr. 8, 2003 (DE) ................ 103 16 079

(51) Int. Cl.
  *C08L 29/04* (2006.01)
(52) U.S. Cl. .............. 524/803; 524/819; 524/3; 524/503; 523/342
(58) Field of Classification Search ......... 524/803, 524/819, 3, 503; 523/342
  See application file for complete search history.

(56) References Cited

U.S. PATENT DOCUMENTS

| | | | | |
|---|---|---|---|---|
| 5,567,750 A | * | 10/1996 | Schulze et al. | 524/3 |
| 5,604,272 A | * | 2/1997 | Penzel et al. | 524/3 |
| 5,703,156 A | * | 12/1997 | Sauer | 524/802 |
| 6,133,345 A | * | 10/2000 | Pakusch et al. | 523/342 |

FOREIGN PATENT DOCUMENTS

| | | |
|---|---|---|
| DE | 197 07 746 | 8/1998 |
| DE | 198 53 489 | 5/2000 |
| DE | 199 28 933 | 12/2000 |
| DE | 199 62 566 | 7/2001 |
| DE | 101 26 560 | 9/2002 |
| DE | 10 253 046 | 6/2004 |
| EP | 0 407 889 | 1/1991 |
| EP | 0 467 103 | 1/1992 |
| EP | 0 549 280 | 6/1993 |
| EP | 0 629 650 | 12/1994 |
| EP | 0 671 435 | 9/1995 |
| EP | 0 812 872 | 12/1997 |
| JP | 59-162161 | 9/1984 |
| WO | WO 03/031365 A1 | 4/2003 |

OTHER PUBLICATIONS

Derwent Abstract corresponding to EP 467 103 [AN 1992-017016].
Derwent Abstract corresponding to DE 197 07 746 [AN 1998-449092].
Derwent Abstract corresponding to EP 629 650 [AN 1995-024204].
Derwent Abstract corresponding to EP 671 435 [AN 1995-312754].
Derwent Abstract corresponding to EP 407 889 [AN 1991-016132].
Derwent Abstract corresponding to EP 812 872 [AN 1998-034940].
English Translation of DE 10 253 046.
English Abstract corresponding to JP 59/162161 [AN 1984-266251].
Fox, T.G., Bull. Am. Physics Soc., 3, p. 123 (1956).
Polymer Handbook, 2nd Edition, J. Wiley & Sons, New York (1975).
Derwent Abstract Corresponding to DE 101 26 560 [AN 2002-584896].
Derwent Abstract Corresponding to DE 199 62 566 [AN 2002-515952].
Derwent Abstract Corresponding to DE 199 28 933 [AN-2001-148205].
Derwent Abstract Corresponding to DE 198 53 489 [AN 2000-401043].
Derwent Abstract Corresponding to EP 0 812 872 [AN 1998-034940].

* cited by examiner

*Primary Examiner*—David W. Wu
*Assistant Examiner*—Satya B. Sastri
(74) *Attorney, Agent, or Firm*—Brooks Kushman P.C.

(57) ABSTRACT

Polyvinyl-alcohol-stabilized redispersible powders which have plasticizing properties are obtained by drying polyvinyl-alcohol-stabilized aqueous dispersions of polymers of one or more monomers from the group of vinyl esters of optionally branched $C_{1-18}$ alkylcarboxylic acids, (meth)acrylic esters of optionally branched $C_{1-15}$ alcohols, dienes, olefins, vinylaromatics and vinylhalides,
in the presence of a copolymer formed from
  a) one or more monomers from the group of ethylenically unsaturated monocarboxylic acids, ethylenically unsaturated dicarboxylic acids and their anhydrides, each having 4 to 8 carbon atoms, and salts thereof,
  b) one or more ethylenically unsaturated compounds containing sulfonic, sulfuric, and/or phosphonic acid groups, and salts thereof, and
  c) one or more monomers from the group consisting of vinyl esters of optionally branched $C_{1-18}$ alkylcarboxylic acids and (meth)acrylic esters of optionally branched $C_{1-15}$ alcohols.

5 Claims, No Drawings

POLYVINYL-ALCOHOL-STABILIZED REDISPERSIBLE POWDERS WITH PLASTICIZING PROPERTIES

BACKGROUND OF THE INVENTION

1. Field of the Invention

The invention relates to polyvinyl-alcohol-stabilized redispersible powders having plasticizing properties, to processes for preparing them, and to their use in chemical products for the construction industry.

2. Background Art

Polymer powders stabilized with protective colloid which are redispersible in water (redispersible powders) are employed as additives in construction compositions, based for example on cement or gypsum, in order to improve strength and abrasion resistance, or in the case of construction adhesives, to improve adhesive tensile strength. The protective colloid used is frequently polyvinyl alcohol, since this colloid contributes to improved strength, in comparison to polymers stabilized with low molecular weight emulsifiers.

Redispersible powders of this kind are obtainable by drying the corresponding protective-colloid-stabilized polymer dispersions, with the addition during drying of so-called drying assistants (spraying aids), in order to prevent the formation of agglomerates. In EP-A 467103 water-soluble copolymers with carboxyl-functional comonomer units are used as drying assistants. DE-A 19707746 describes the use of copolymers of ethylenically unsaturated carboxylic acids and their hydroxyalkyl esters as drying assistants. EP-A 629650 discloses copolymers containing acrylamidomethylpropanesulfonic acid units as a spraying aid. EP-A 671435 recommends spray drying in the presence of copolymers containing hydrophilic, water-soluble, and salt-forming monomers.

In many cases modification of construction compositions such as mortar or concrete with redispersible powders decreases fluidity. In the case of fluid mortars such as self-leveling fillers or screeds, however, a liquid consistency which exhibits little change during processing, is essential. Consequently, in these applications, additives known as cement plasticizers are employed. For example, EP-A 549280 describes plasticizers based on graft copolymers containing four different comonomer units: (meth)acrylic acid units, hydroxyalkyl (meth)acrylate units, (meth)acrylamido-2-methylpropanesulfonic acid, and (meth)acrylates containing EO groups. JP-A 59/162161 describes water-soluble copolymers containing hydroxyalkyl esters of an ethylenically unsaturated monocarboxylic acid and ethylenically unsaturated monocarboxylic or dicarboxylic acid units. EP-A 407889 discloses redispersible powders which employ phenolsulfonic acid-formaldehyde condensation products in order to improve their fluidity when used in hydraulic binders. EP-A 812872 describes processes for preparing polymer powders with the addition of drying assistants having a plasticizing effect.

SUMMARY OF THE INVENTION

An object of the invention is to provide redispersible powders stabilized with polyvinyl alcohol which improve the fluidity of construction compounds to which they are added. This and other objects are achieved through the preparation and use of a polyvinyl alcohol-stabilized mixture of a first redispersible polymer or copolymer, and a second copolymer prepared from at least two acid-containing monomers.

DETAILED DESCRIPTION OF THE PREFERRED EMBODIMENT(S)

The invention provides polyvinyl-alcohol-stabilized redispersible powders having plasticizing properties, obtainable by drying polyvinyl-alcohol-stabilized aqueous dispersions of homopolymers or copolymers of one or more monomers from the group of vinyl esters of branched or unbranched ("optionally branched") alkylcarboxylic acids having 1 to 18 carbon atoms, acrylic and methacrylic esters ("(meth)acrylic esters") of optionally branched of alcohols having 1 to 15 carbon atoms, dienes, olefins, vinylaromatics and vinylhalides ("base polymer"), in the presence of a copolymer formed from a) one or more monomers from the group of ethylenically unsaturated monocarboxylic acids, ethylenically unsaturated dicarboxylic acids and their anhydrides, having in each case 4 to 8 carbon atoms, and also salts thereof, b) one or more ethylenically unsaturated compounds containing sulfonic, sulfuric, or phosphonic acid groups, and also salts thereof, and c) one or more monomers from the group of vinyl esters of optionally branched alkylcarboxylic acids having 1 to 18 carbon atoms and acrylic and methacrylic esters of optionally branched alcohols having 1 to 15 carbon atoms.

Vinyl esters suitable for the base polymer are those of carboxylic acids having 1 to 18 carbon atoms. Preferred vinyl esters are vinyl acetate, vinyl propionate, vinyl butyrate, vinyl-2-ethylhexanoate, vinyl laurate, 1-methylvinyl acetate, vinyl pivalate, and vinyl esters of α-branched monocarboxylic acids having 9 to 13 carbon atoms, such as VeoVa9® or VeoVa10® (trade names of Resolution Products). Particular preference is given to vinyl acetate.

Suitable methacrylic or acrylic esters are esters of optionally branched alcohols having 1 to 15 carbon atoms, such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and norbornyl acrylate. Preference is given to methyl acrylate, methyl methacrylate, n-butyl acrylate, and 2-ethylhexyl acrylate.

Examples of olefins and dienes are ethylene, propylene, and 1,3-butadiene. Suitable vinylaromatics are styrene and vinyl toluene. A suitable vinyl halide is vinyl chloride.

If desired it is also possible to copolymerize from 0.05 to 50% by weight, preferably from 1 to 10% by weight of auxiliary monomers, based on the total weight of the base polymer. Examples of auxiliary monomers are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide and acrylonitrile; monoesters and diesters of fumaric and maleic acid, such as the diethyl and diisopropyl esters; maleic anhydride; and ethylenically unsaturated sulfonic acids and their salts, preferably vinylsulfonic acid and 2-acrylamido-2-methylpropanesulfonic acid. Further examples are precrosslinking comonomers such as polyethylenically unsaturated comonomers, examples being divinyl adipate, diallyl maleate, allyl methacrylate, and triallyl cyanurate; and postcrosslinking comonomers, examples being acrylamidoglycolic acid (AGA), methylacrylamidoglycolic acid methyl ester (MAGME), N-methylolacrylamide (NMA), N-methylolmethacrylamide (NMMA), N-methylolallylcarbamate, alkyl ethers and esters of N-methylolacrylamide, of N-methylolmethacrylamide, and of N-methylolallylcarbamate such as the isobutoxy ethers or esters. Also suitable are epoxy-functional comonomers such as glycidyl methacrylate and glycidyl acrylate. Further examples are silicon-functional comonomers, such as acryloyloxypropyltri(alkoxy)silanes and methacryloyloxypropyltri(alkoxy)silanes, vinyltrialkoxysilanes, and vinylmethyldialkoxysilanes, in which the alkoxy groups present can be, for example, methoxy, ethoxy, and ethoxypropylene glycol ether radicals. Mention may also be made of monomers containing hydroxyl or CO groups, examples being hydroxyalkyl acrylates and methacrylates such as hydroxyethyl, hydroxypropyl or hydroxybutyl acrylate or methacrylate, and also compounds such as diacetoneacrylamide and acetylacetoxyethyl acrylate or methacrylate.

Examples of suitable homopolymers and copolymers are vinyl acetate homopolymers, copolymers of vinyl acetate with ethylene, copolymers of vinyl acetate with ethylene and one or more further vinyl esters, copolymers of vinyl acetate with ethylene and acrylate and/or methacrylate, copolymers of vinyl acetate with ethylene and vinyl chloride, styrene-acrylate copolymers, and styrene-1,3-butadiene copolymers, it being possible for the polymers to also include the aforementioned auxiliary monomers.

Preference is given to vinyl acetate homopolymers; copolymers of vinyl acetate with from 1 to 40% by weight of ethylene; copolymers of vinyl acetate with from 1 to 40% by weight of ethylene and from 1 to 50% by weight of one or more further comonomers from the group of vinyl esters having 1 to 12 carbon atoms in the carboxylic acid radical, such as vinyl propionate, vinyl laurate, vinyl esters of alpha-branched carboxylic acids having 9 to 13 carbon atoms, such as VeoVa9, VeoVa10, and VeoVa11; copolymers of vinyl acetate, from 1 to 40% by weight of ethylene and, preferably, from 1 to 60% by weight of acrylates and/or methacrylates of branched or unbranched alcohols having 1 to 15 carbon atoms, especially n-butyl acrylate and/or 2-ethylhexyl acrylate and/or methyl methacrylate; and copolymers with from 30 to 75% by weight of vinyl acetate, from 1 to 30% by weight of vinyl laurate or vinyl esters of an alpha-branched carboxylic acid having 9 to 11 carbon atoms, and also from 1 to 30% by weight of acrylic esters of branched or unbranched alcohols having 1 to 15 carbon atoms, especially n-butyl acrylate or 2-ethylhexyl acrylate, further containing from 1 to 40% by weight of ethylene; and copolymers of vinyl acetate, from 1 to 40% by weight of ethylene and from 1 to 60% by weight of vinyl chloride; it being possible for the polymers to also include the aforementioned auxiliary monomers in the stated amounts, with the figures in % by weight adding up in each case to 100% by weight.

Preference is also given to copolymers of n-butyl acrylate or 2-ethylhexyl acrylate or copolymers of methyl methacrylate with n-butyl acrylate and/or 2-ethylhexyl acrylate; styrene-acrylate copolymers with one or more monomers from the group consisting of methyl acrylate, ethyl acrylate, propyl acrylate, n-butyl acrylate, and 2-ethylhexyl acrylate; vinyl acetate-acrylate copolymers with one or more monomers from the group consisting of methyl acrylate, ethyl acrylate, propyl acrylate, n-butyl acrylate, 2-ethylhexyl acrylate, and, optionally ethylene; and styrene-1,3-butadiene copolymers; it being possible for the polymers to additionally include the abovementioned auxiliary monomers in the stated amounts.

The selection of monomers and/or the selection of the weight fractions of the comonomers is made such that in general the resulting glass transition temperature Tg is from −50° C. to +50° C., preferably from −30° C. to +40° C. The glass transition temperature Tg of the polymers can be determined conventionally by means of Differential Scanning Calorimetry (DSC). The Tg can also be calculated approximately in advance using the Fox equation. According to T. G. Fox, BULL. AM. PHYSICS SOC. 1, 3, page 123 (1956): $1/Tg = x1/Tg1 + x2/Tg2 + \ldots + xn/Tgn$, where xn stands for the mass fraction (% by weight/100) of the monomer n, and Tgn is the glass transition temperature, in degrees Kelvin, of the homopolymer of the monomer n. Homopolymer Tg values are listed in the POLYMER HANDBOOK 2nd Edition, J. Wiley & Sons, New York. (1975).

Suitable polyvinyl alcohols are partly or fully hydrolyzed polyvinyl alcohols. Preference is given to partly or fully hydrolyzed polyvinyl alcohols having a degree of hydrolysis of from 80 to 100 mol %, especially to partly hydrolyzed polyvinyl alcohols having a degree of hydrolysis of from 80 to 95 mol % and a Höppler viscosity, in 4% by weight aqueous solution, of from 1 to 30 mPas (Höppler method at 20° C., DIN 53015). Preference is also given to partly hydrolyzed, hydrophobically modified polyvinyl alcohols having a degree of hydrolysis of from 80 to 95 mol % and a Höppler viscosity, in 4% by weight aqueous solution, of from 1 to 30 mPas. Examples thereof are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 11 carbon atoms, dialkyl maleates and dialkyl fumarates such as diisopropyl maleate and diisopropyl fumarate, vinyl chloride, vinyl alkyl ethers such as vinyl butyl ether, and olefins such as ethene and decene. The fraction of the hydrophobic units is preferably from 0.1 to 10% by weight, based on the total weight of the partly hydrolyzed polyvinyl alcohol. It is also possible to use mixtures of polyvinyl alcohols.

Greatest preference is given to polyvinyl alcohols having a degree of hydrolysis of from 85 to 94 mol % and a Höppler viscosity, in 4% by weight aqueous solution, of from 3 to 15 mPas (Höppler method at 20° C., DIN 53015). These polyvinyl alcohols are obtainable by methods which are known to one skilled in the art, and are generally added during the polymerization in an amount totaling from 1 to 20% by weight, based on the total weight of the monomers.

The polyvinyl-alcohol-stabilized polymer dispersions can be prepared by conventional methods, an example being the emulsion polymerization described in DE-A 10253046, preferably by means of free-radical initiated emulsion polymerization.

The plasticizing copolymer preferably includes as comonomer a) one or more monomers from the group of acrylic acid, methacrylic acid, crotonic acid, itaconic acid, fumaric acid, maleic acid, and salts of these carboxylic acids.

Preferred monomers b) are vinylsulfonic acid and its alkali metal and alkaline earth metal salts, styrenesulfonic acid and its alkali metal and alkaline earth metal salts, methallylsulfonic acid and its alkali metal and alkaline earth metal salts, p-methallyloxyphenylsulfonic acid and its alkali metal and alkaline earth metal salts, and sulfonic acids of the general formula $CH_2=CR^1-CO-X-CR^2R^3-R^4-SO_3H$ and their alkali metal and alkaline earth metal salts, where X is O or NH, $R^1$, $R^2$, and $R^3$ are identical or different and are defined as H and $C_1$ to $C_3$ alkyl, and $R^4$ is $C_1$ to $C_4$ alkylene. Particular preference is given to vinylsulfonic acid, sulfopropyl (meth)acrylate, 2-acrylamido-2-methylpropanesulfonic acid, and methallylsulfonic acid, and their respective alkali metal and alkaline earth metal salts.

Preferred vinyl ester comonomers c) are vinyl acetate and vinyl propionate. Preferred methacrylic or acrylic esters are methyl acrylate, methyl methacrylate, ethyl acrylate, ethyl methacrylate, propyl acrylate, propyl methacrylate, n-butyl acrylate, n-butyl methacrylate, and 2-ethylhexyl acrylate.

The weight fraction of the comonomer units a) is preferably from 10 to 50% by weight, more preferably from 10 to 30% by weight, based on the total weight of the copolymer. The fraction of the comonomer units b) is preferably from 10 to 50% by weight, more preferably from 10 to 30% by weight, based on the total weight of the copolymer. The fraction of the comonomer units c) is preferably from 20 to 80% by weight, more preferably from 30 to 70% by weight, based on the total weight of the copolymer. The copolymer has a number-average molecular weight Mn of less than 50,000 daltons, preferably from 5,000 to 20,000 daltons.

The fraction of the plasticizing copolymer in the redispersible powder is from 0.1 to 25% by weight, preferably from 2 to 20% by weight, based on the weights of the polymeric constituents of the redispersible powder.

To prepare the redispersible powders the aqueous, polyvinyl-alcohol-stabilized dispersions, together with the plasticizing copolymer, are dried, for example by means of fluidized-bed drying, freeze drying or spray drying. The dispersions are preferably spray dried, more preferably following the addition of further polyvinyl alcohol as a spraying aid. Spray drying takes place in conventional spray-drying installations, with atomization by any suitable means, for example, single-fluid, two-fluid or multifluid nozzles, or with a rotating disk. The exit temperature chosen is generally in the range from 45° C. to 120° C., preferably 60° C. to 90° C., depending on installation, resin Tg, and desired degree of drying.

It is preferred to use polyvinyl alcohol as a spraying aid in an amount such that the total amount of polyvinyl alcohol prior to the drying operation is from 3 to 25% by weight, based on the polymer fraction more preferably from 5 to 20% by weight. Preferred spraying aids are the polyvinyl alcohols set out above as being suitable for use with protective colloids.

In the case of nozzle spraying it has frequently been found advantageous to include up to 1.5% by weight of antifoam, based on the base polymer. In order to enhance the storage properties by improving the blocking stability, particularly in the case of low glass transition temperature powders, the resulting powder can be provided with an antiblocking (anticaking) agent, preferably at preferably up to 30% by weight, based on the total weight of the polymeric constituents. Examples of antiblocking agents include Ca or Mg carbonates, talc, gypsum, silica, kaolins, and silicates having small particle sizes, preferably in the range from 10 nm to 10 μm. The viscosity of the feed to be sprayed is adjusted by way of the solids content so as to be less than 500 mPas (Brookfield viscosity, 20 s$^{-1}$, at 23° C.), preferably less than 250 mPas. The solids content of the dispersion for spraying is preferably greater than 35%, more preferably greater than 40%.

In order to improve the performance properties it is possible to add further ingredients during spraying. Examples of further constituents of dispersion powder compositions that may be present in preferred embodiments include pigments, fillers, foam stabilizers, and hydrophobicizers.

The water-redispersible polymer powder compositions obtainable in this way can be employed in the areas typical for them. For example, in chemical products for the construction industry, alone or in conjunction with hydraulically setting binders such as cements, e.g. Portland, aluminate, pozzolanic, slag, magnesia, and phosphate cements, or gypsum, lime and waterglass, for the production of construction adhesives, especially tile adhesives and exterior insulation adhesives, plasters and renders, filling compounds, trowel-applied flooring compounds, leveling compounds, grouts, jointing mortars, and paints, and with particular preference, for self-leveling floor-filling compounds and flowable screeds.

Typical formulations of self-leveling, hydraulically setting compounds include from 100 to 500 parts by weight of cement such as Portland cement and/or alumina cement, from 300 to 800 parts by weight of fillers such as sand and/or ground limestone and/or silica dusts and/or fly ash, from 0 to 200 parts by weight of anhydrite, hemihydrate and/or gypsum, from 0 to 50 parts by weight of calcium hydroxide, from 0 to 5 parts by weight of defoamer, from 0.5 to 10 parts by weight of dispersant, from 1 to 100 parts by weight of redispersible powder, from 0.5 to 5 parts by weight of retardants such as tartaric acid, citric acid or saccharides, from 0.5 to 5 parts by weight of accelerators, examples being alkali metal carbonates, and from 0.2 to 3 parts by weight of thickeners such as cellulose ethers, the amounts adding up to 1,000 parts by weight, and the dry mix is stirred together with an amount of water to provide the desired consistency.

With the redispersible powders of the invention there is no longer any need to use additional plasticizers in self-leveling filling compound (SLF) applications. It has been surprisingly discovered, in addition, that when polyvinyl-alcohol-stabilized dispersion and plasticizer are spraydried simultaneously a marked increase in the plasticizing effect is observed. It has additionally been found that polyvinyl-alcohol-stabilized powders modified not in accordance with the invention but instead with the customary plasticizers containing high proportions of ethylene oxide and/or propylene oxide units give very poorly redispersing powders which lack blocking stability and are unsuitable for use in chemical products for the construction industry.

EXAMPLES

The redispersible powders prepared by spray drying were investigated in the self-leveling formulation indicated in table 1. The individual components were mixed dry and then stirred with 21 g of water per 100 g of dry mix.

TABLE 1

| Amount [g] | Raw material | Manufacturer/Supplier |
| --- | --- | --- |
| 94.0 | High alumina cement Fondue | Lafarge Aluminates int. |
| 200.0 | Portland cement CEM I 42.5 R | Milke-Zement GmbH & Co. KG |
| 47.0 | Anhydrite | Hilliges Gipswerke KG |
| 47.0 | Light spar | W. Priem & Co. |
| 359.0 | Quartz sand H 33 | Quarzwerke GmbH |
| 226.3 | Calcium carbonate OMYACARB ™ 20 BG | Omya GmbH |
| 23.0 | RD powder/plasticizer | |
| 1.2 | Tartaric acid | Merck Eurolab GmbH |
| 1.0 | Li$_2$CO$_3$ | Merck Eurolab GmbH |
| 1.0 | Defoamer, AGITAN ™ P 800 | Münzing Chemie GmbH |
| 0.5 | Cellulose, TYLOSE ™ H 300 P2 | Clariant GmbH |
| 1000 | | |

Comparative Example 1

20 parts by weight of a redispersible powder based on a vinyl acetate/ethylene copolymer having a Tg of 17° C. and containing 8% by weight of partially hydrolyzed polyvinyl alcohol were blended beforehand with 3 parts by weight of Melflux 1641 (powderous plasticizer from Degussa) and tested in the above formulation. The results are summarized in table 2.

Comparative Example 2

23 parts by weight of a redispersible powder prepared by spraying an aqueous polymer dispersion based on a vinyl acetate/ethylene copolymer having a Tg of 17° C. and containing 8% by weight of partially hydrolyzed polyvinyl alcohol, and with 10% by weight of Melflux 1641, were tested in the above formulation. The results are summarized in table 2.

Example 3

23 parts by weight of a redispersible powder prepared by spraying an aqueous polymer dispersion based on a vinyl acetate/ethylene copolymer having a Tg of 17° C., stabilized with 8% by weight of partially hydrolyzed polyvinyl alcohol, and containing 5% by weight of partially hydrolyzed polyvinyl alcohol, and with 7.4% by weight of plasticizer A (copolymer of 22% by weight methacrylic acid, 49% by weight ethyl acrylate, 7% by weight methyl methacrylate, and 22% by weight sulfopropyl acrylate), were tested in the above formulation. The results are summarized in Table 2.

Example 4

Example 3 was followed, but instead of co-spraying with 7.4% by weight of plasticizer A, 6.7% by weight of plasticizer B (copolymer of 27% by weight methacrylic acid, 49% by weight ethyl acrylate, 7% by weight methyl methacrylate, 17% by weight sulfopropyl acrylate) was used. The results are summarized in Table 2.

Example 5

Example 3 was followed, but instead of co-spraying with 7.4% by weight of plasticizer A, 10% by weight of plasticizer A was used. The results are summarized in table 2.

Comparative Example 6

20 parts by weight of a redispersible powder based on a vinyl acetate/ethylene copolymer having a Tg of 17° C. and containing 8% by weight of partially hydrolyzed polyvinyl alcohol were blended beforehand with 3 parts by weight of plasticizer A and tested in the above formulation. The results are summarized in Table 2.

Comparative Example 7

20 parts by weight of a redispersible powder based on a vinyl acetate/ethylene copolymer having a Tg of 17° C. and containing 8% by weight of partially hydrolyzed polyvinyl alcohol were blended beforehand with 3 parts by weight of plasticizer B and tested in the above formulation. The results are summarized in Table 2.

Example 8

23 parts by weight of a redispersible powder prepared by spraying an aqueous polymer dispersion based on a vinyl acetate/ethylene/VeoVa10 copolymer having a Tg of 5° C. and stabilized with 8% by weight of partially hydrolyzed polyvinyl alcohol, together with 5% by weight of partially hydrolyzed polyvinyl alcohol and 10% by weight of plasticizer A, were tested in the above formulation. The results are summarized in Table 2.

Performance Tests:

Determination of Slump (Leveling):
The rheology was determined in accordance with DIN EN 12706 after periods of 1, 15, and 30 minutes.

Determining the Flexural Strength Under Tension (FS):
The flexural strength under tension was determined after 1 day (1d) and 7 days (7d) and was performed in accordance with prEN 13851 on prisms measuring 40×40×160 mm$^3$.

Determining the Compressive Strength (CS):
The compressive strength was determined after 1 day (1d) and 7 days (7d) and was performed in accordance with prEN 13851 on standard prisms measuring 40×40×160 mm$^3$.

Determination of Blocking Resistance (BR):
The blocking resistance was determined by introducing the dispersion powder into an iron tube with a screw fitting and then subjecting it to the action of a metal ram. After ramming, the tube was stored in a drying cabinet at 50° C. for 16 hours. After cooling to room temperature, the powder was removed from the tube and the blocking stability was determined qualitatively by crushing the powder. The blocking stability was classified as follows:

1-3=very good blocking stability
4-6=good blocking stability
7-8=satisfactory blocking stability
9-10=not stable to blocking, powder is no longer free-flowing after crushing.

Determining the Settling Behavior RA:
The settling behavior of the redispersion is a measure of the redispersibility of the powders. The redispersions were produced as 50% strength by weight aqueous redispersions, using strong shearing forces. The settling behavior was then determined on dilute redispersions (0.5% solids content), by introducing 100 ml of this dispersion into a graduated tube and measuring the settling height of solid material. The result is reported as mm of settling after 24 hours. Figures greater than 7 indicate inadequate redispersion of powder.

A comparison of comparative Example 1 with Comparative Example 2 shows that with conventional plasticizers, co-spraying produces redispersible powders having a reduced plasticizing effect.

A comparison of Example 3 with Comparative Example 6 and a comparison of Example 4 with Comparative Example 7 shows that with the plasticizers used in accordance with the invention co-spraying improves the plasticizing effect.

TABLE 2

| Example | Leveling 1' [cm] | Leveling 15' [cm] | Leveling 30' [cm] | FS 1 d/7 d [N/mm$^2$] | CS 1 d/7 d [N/mm$^2$] | BR | RA 1 h/24 h |
|---|---|---|---|---|---|---|---|
| C. Ex. 1 | 16.0 | 16.2 | 16.4 | 3.83/4.48 | 19.64/24.37 | 3 | 0.2/1 |
| C. Ex. 2 | 10.6 | 9.8 | 8.5 | 3.11/4.06 | 14.72/22.34 | 10 | >7/— |
| Ex. 3 | 16.3 | 16.2 | 16.1 | 3.79/5.55 | 19.12/24.52 | 4 | 0.1/1 |
| Ex. 4 | 15.4 | 15.5 | 16.0 | 3.80/5.53 | 18.35/26.12 | 3 | 0.1/0.8 |
| Ex. 5 | 16.8 | 16.3 | 16.5 | 4.01/5.78 | 18.56/25.48 | 4 | 0.1/0.9 |
| C. Ex. 6 | 15.6 | 15.7 | 15.4 | 3.78/4.62 | 17.91/24.74 | 3 | 0.2/1 |
| C. Ex. 7 | 15.3 | 15.5 | 15.2 | 3.78/4.63 | 20.72/28.01 | 3 | 0.2/1 |
| Ex. 8 | 16.9 | 16.7 | 16.7 | 3.80/5.52 | 17.16/23.07 | 4 | 0.2/1.2 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A polyvinyl alcohol-stabilized redispersible powder having plasticizing properties, prepared by drying a polyvinyl alcohol-stabilized, aqueous dispersion of at least one homopolymeric or copolymeric base polymer comprising polymerized monomers selected from the group consisting of vinyl esters of optionally branched $C_{1-18}$ alkylcarboxylic acids, (meth)acrylic esters of optionally branched $C_{1-15}$ alcohols, dienes, olefins, vinylaromatics and vinylhalides,
   in the presence of a plasticizing copolymer comprising a copolymerisate comprising:
   a) at least one monomer selected from the group consisting of ethylenically unsaturated $C_{4-8}$ monocarboxylic acids, ethylenically unsaturated $C_{4-8}$ dicarboxylic acids, ethylenically unsaturated $C_{4-8}$ dicarboxylic acid anhydrides, and salts thereof, in an amount of from about 10 to about 50 weight percent,
   b) at least one ethylenically unsaturated monomer containing sulfonic, sulfuric, and/or phosphonic acid groups, and/or salts thereof, in an amount of from about 10 to about 50 weight percent, and
   c) at least one monomer selected from the group consisting of vinyl esters of optionally branched $C_{1-18}$ alkylcarboxylic acids and (meth)acrylic esters of optionally branched $C_{1-15}$ alcohols, in an amount of from about 20 to about 80 weight percent,
   said weight percents based on the total weight of said plasticizing copolymer,
   wherein said base polymer is an ethylene/vinyl acetate copolymer, and the plasticizer is a copolymer of at least one carboxyl-group-containing monomer selected from the group consisting of acrylic acid, methacrylic acid, crotonic acid, itaconic acid, fumaric acid, maleic acid, and salts thereof, of sulfopropylacrylate, and one or more alkyl(meth)acrylates.

2. The redispersible powder of claim 1, wherein at least one polyvinyl alcohol is selected from the group consisting of partially and fully hydrolyzed polyvinyl alcohols having a degree of hydrolysis of from 80 to 100 mol % and a Höppler viscosity in 4% by weight aqueous solution of from 1 to 30 mPa·s, and partially hydrolyzed, hydrophobically modified polyvinyl alcohols having a degree of hydrolysis of from 80 to 95 mol % and a Höppler viscosity in 4% by weight aqueous solution of from 1 to 30 mPas.

3. A polyvinyl alcohol-stabilized redispersible powder having plasticizing properties, prepared by drying a polyvinyl alcohol-stabilized, aqueous dispersion of at least one homopolymeric or copolymeric base polymer comprising polymerized monomers selected from the group consisting of vinyl esters of optionally branched $C_{1-18}$ alkylcarboxylic acids, (meth)acrylic esters of optionally branched $C_{1-15}$ alcohols, dienes, olefins, vinylaromatics and vinylhalides,
   in the presence of a plasticizing copolymer comprising a copolymerisate comprising:
   a) at least one monomer selected from the group consisting of ethylenically unsaturated $C_{4-8}$ monocarboxylic acids, ethylenically unsaturated $C_{4-8}$ dicarboxylic acids, ethylenically unsaturated $C_{4-8}$ dicarboxylic acid anhydrides, and salts thereof, in an amount of from about 10 to about 50 weight percent,
   b) at least one ethylenically unsaturated monomer containing sulfonic, sulfuric, and/or phosphonic acid groups, and/or salts thereof, in an amount of from about 10 to about 30 weight percent, and
   c) at least one monomer selected from the group consisting of vinyl esters of optionally branched $C_{1-18}$ alkylcarboxylic acids and (meth)acrylic esters of optionally branched $C_{1-15}$ alcohols, in an amount of from about 30 to about 70 weight percent,
   said weight percents based on the total weight of said plasticizing copolymer, wherein said base polymer is an ethylene/vinyl acetate copolymer, and the plasticizer is a copolymer of at least one carboxyl-group-containing monomer selected from the group consisting of acrylic acid, methacrylic acid, crotonic acid, itaconic acid, fumaric acid, maleic acid, and salts thereof, of sulfopropylacrylate, and one or more alkyl(meth)acrylates and wherein the copolymer has a number-average molecular weight Mn of less than 50,000 daltons.

4. The redispersible powder of claim 1, wherein one carboxyl-group containing monomer is methacrylic acid and the alkyl(meth)acrylates include one or both of ethylacrylate and methyl methacrylate.

5. The redispersible powder of claim 3, wherein one carboxyl-group containing monomer is methacrylic acid and the alkyl(meth)acrylates include one or both of ethylacrylate and methyl methacrylate.

* * * * *